(12) United States Patent
Yovichin et al.

(10) Patent No.: US 7,189,069 B2
(45) Date of Patent: Mar. 13, 2007

(54) MOLD FOR FORMING AN ANNULAR TREAD BELT

(75) Inventors: Albert James Yovichin, Doylestown, OH (US); Larry Eugene Steidl, Akron, OH (US); Daniel Patrick Hentosz, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 309 days.

(21) Appl. No.: 10/678,997

(22) Filed: Oct. 3, 2003

(65) Prior Publication Data

US 2005/0073074 A1     Apr. 7, 2005

(51) Int. Cl.
*B29C 33/20*     (2006.01)
(52) U.S. Cl. .............................. 425/35; 425/40; 425/47
(58) Field of Classification Search .................. 425/35, 425/40, 47, 50, 54, 55, 57
See application file for complete search history.

(56) References Cited

U.S. PATENT DOCUMENTS

| | | | | |
|---|---|---|---|---|
| 2,381,395 | A | * 8/1945 | Brown | 425/40 |
| 3,358,330 | A | * 12/1967 | Pacciarini et al. | 425/54 |
| 3,553,309 | A | 1/1971 | Pacciarini et al. | 264/313 |
| 3,659,976 | A | * 5/1972 | Yavorsky et al. | 425/47 |
| 3,791,897 | A | 2/1974 | Mesly | 156/137 |
| 3,934,968 | A | 1/1976 | Cicognani | 425/28 B |
| 4,207,052 | A | 6/1980 | Satzler | 425/394 |
| 4,263,083 | A | * 4/1981 | Schleiger | 264/326 |
| 4,510,113 | A | 4/1985 | Takano et al. | 264/257 |
| 5,066,448 | A | * 11/1991 | Chlebina et al. | 264/326 |
| 6,086,811 | A | 7/2000 | Fike | 264/271.1 |
| 6,177,042 | B1 | * 1/2001 | Fike | 264/326 |
| 6,716,012 | B2 | * 4/2004 | Yovichin et al. | 425/55 |

FOREIGN PATENT DOCUMENTS

| | | |
|---|---|---|
| EP | 0 419 424 A2 | 3/1991 |
| EP | 1 199 192 A2 | 4/2002 |
| JP | 07 144375 A | 10/2005 |
| WO | 03/008207 A1 | 1/2003 |

* cited by examiner

*Primary Examiner*—James P. Mackey
(74) *Attorney, Agent, or Firm*—June E. Rickey

(57) ABSTRACT

A segmented annular mold for forming a tread belt having a reinforcing belt structure, the belt structure having a radial thickness (t) is disclosed. The mold has a plurality of radially movable and outwardly expandable inner segments for forming the inner surface of the tread belt and a plurality of radially movable and contracting outer segments for forming the outer tread belt surface. The radially inner and radially outer segments form a mold parting line at a location radially outward of a midpoint of the belt reinforcing structure of the tread belt at a location greater than 50% (t) as measured from the radially innermost surface of the belt reinforcing structure. The radially inner segments have upper and lower lateral edge forming portions extending outwardly to the parting line. Similarly, the radially outer mold segments have upper and lower lateral edge forming portions extending inwardly to the parting line. The parting line is located at least radially outwardly of a radially inner second belt layer of the belt reinforcing structure.

10 Claims, 8 Drawing Sheets

MOLD FOR FORMING AN ANNULAR TREAD BELT

FIELD OF THE INVENTION

The present invention relates to a mold for curing annular or ring treads, more preferably an annular tread belt assembly and further includes a unique method for molding said annular assemblies.

BACKGROUND OF THE INVENTION

In the making and curing of tire treads or tire tread and belt assemblies, it has been a common practice to wrap one or more layers of an uncured elastomer such as rubber, with or without reinforcements, such as metal cord reinforced plies or fabric and the like about a cylindrical core. The cylindrical core was selected to have a diameter equal to the desired inside diameter, the cylindrical core, with the elastomeric layers attached is generally placed in the center of a cylindrical core of a larger segmented cylinder, which larger segmented cylinder can include mold faces with desired tread patterns on the interior surface thereof, the diameter of the larger segmented cylinder is reduced until it properly contacts the material wrapped about the inner core apparatus and the entire apparatus is heated. The outer mold face segmented cylinder can, of course, be constantly heated but it is more difficult to heat the inner core about which the rubber is wrapped. As a result, premature curing might then take place. In U.S. Pat. No. 4,207,052 it was disclosed that this type of uneven curing of the elastomer deforms the cured tire tread or track belt assembly, in particular the metal cords within the tread belt can be displaced in such prior art molds due to the large temperature gradient between the inner core and the tread forming outer core. Accordingly, U.S. Pat. No. 4,207,052 showed a plurality of inner segments which fit together to form a generally cylindrical mold face surface to form the inner surface of the tread belt along with a means for retracting said plurality of inner segments toward the axis of said inner cylinder and a means for heating said segments. Additionally, the apparatus included a plurality of outer segments which fit together to form an inner generally cylindrical mold face surface of an outer cylinder, said outer cylinder being coaxial with said inner cylinder and of equal lengths therewith along with the means for retracting the plurality of outer segments away from the common axis of said cylinders and a means for heating said plurality of outer segments. The apparatus further included a pair of rings for sealing said inner cylinder to said outer cylinder at the ends thereof, at least one of said sealing rings being removable so that an uncured tire tread or track belt could be positionable between said plurality of inner segments and said plurality of outer segments wherein said plurality of inner segments was retracted toward said common axis and said plurality of outer segments is retracted away from said common axis.

The advantage of the above-referenced prior art mold for producing a tire tread or track belt assembly was that a uniformity of heat and pressure could be achieved upon the molded assembly.

In the prior art it was common for the radially retractable segments to have curved or arcuate shapes with vertically extending edges or sides. The outer segments could move inwardly and create an annular ring for forming the outer tread surface including the tread lugs. The inner segments would move sequentially radially outwardly in an alternating pattern wherein every other inner tread segment would be extended and then every other retracted inner tread segment could be then extended outwardly thereby forming a ring in the fully extended position thereby providing a mold that would cure the tread belt assembly over a period of time. This time was considered the mold cure cycle. Each radially outer segment and each radially inner segment had edges that were generally vertically extending and parallel to the common axis of both the inner and outer segments. Upon curing the tread the inner segments would then be retracted such that the inner surface of the molded tread could be separated from the first radially inward moving segments while the adjacent inner segments held in the closed position would retrain the tread belt assembly within the tread forming outer segments. Once the first radially inner segments had been moved inwardly, the second set of radially inner segments could be moved inwardly thereby releasing the entire inner surface of the tread. Thereafter the outer tread forming segments could be moved radially outwardly thereby releasing the tread belt assembly from the mold in its entirety. As the tread is removed from the outer segments a device would be used to lift the cured tread belt assembly from the mold.

In this type of prior art tread belt assembly molding the radially inner tread forming surface had equal sized tread segments generally with vertical extending edges that extended generally parallel to the axis of the mold rings when in the closed position. Similarly, the outer segments also had vertically extending or generally parallel side faces such that when the mold closed these faces would abut forming a tight joint between the segments. In principle the above-referenced prior art mold as described in U.S. Pat. No. 4,207,052 works generally well for fairly large tread belt assemblies. However, the application of the forces when one closes the inner segments and outer segments of such a mold is such that all movement works in a radial direction increasing the amount of pressure on the radially inward segments substantially.

It has been an objective of the present invention to provide a tread belt mold that would provide improved stability of both the inner and outer segments as the tread belt assemblies being cured such that a uniformity of curing pressure can be insured around the entire 360° circumference.

A second objective of the present invention is to provide a way in which the radially outer mold segments can be provided with improved structural integrity wherein the parting line between the radially inner and radially outer adjacent segments located to minimize rubber flow in an area near the belt reinforcing structure.

SUMMARY OF THE INVENTION

A segmented annular mold for forming a tread belt having a reinforcing belt structure, the belt structure having a radial thickness (t) is disclosed. The mold has a plurality of radially movable and outwardly expandable inner segments for forming the inner surface of the tread belt and a plurality of radially movable and contracting outer segments for forming the outer tread belt surface. The radially inner and radially outer segments form a mold parting line at a location radially outward of a midpoint of the belt reinforcing structure of the tread belt at a location greater than 50% (t) as measured from the radially innermost surface of the belt reinforcing structure.

The radially inner segments have upper and lower lateral edge forming portions extending outwardly to the parting line. Similarly, the radially outer mold segments have upper and lower lateral edge forming portions extending inwardly to the parting line. The parting line is located at least radially outwardly of a radially inner second belt layer of the belt reinforcing structure.

In a preferred embodiment, the tread belt has a radially inner 0° wire reinforced layer, two or more cross angled wire reinforced belt layers interposed between a 90° wire reinforced belt layer and the 0° wire layer; and the mold parting line is located radially between or above the radially outermost cross ply layer and the 90° wire reinforced layer.

The segmented annular mold for forming a tread belt has a plurality of outer tread belt forming segments; a plurality of radially movable and outwardly expandable inner segments for forming the inner surface of the tread belt; and a slidable hub assembly, the slidable hub assembly having a central shaft. The hub assembly has an upper hub portion and a lower hub portion each slidably mounted onto the central shaft. Each upper and lower hub portions have a plurality of linkage arms pivotably connected to the respective hub and the radially inner segments. Each circumferentially adjacent segment is connected to either an upper or lower hub in an alternating pattern. The movement of one hub relative to the other is independently actuated by one or more means for moving the hub portions. The movement of the lower hub and upper hub into interlocking alignment moves the inner segments to form an annular ring.

The segmented annular mold for forming a tread belt has a plurality of split "J" frames, one split "J" frame for supporting each outer tread belt forming segment. A base plate support is attached to each split J frame. A pair of linear bearing rails is attached to the base plates and a plurality of and bearing blocks are mounted onto the linear bearing guide rails. The bearing blocks are attached to the inner and outer segments and the pair of linear bearing rails provides linear guides for the segments.

A cooling plate is attached to the respective segment and interposed between each segment and the linear bearing blocks. The cooling plate has a plurality of passages for passing a coolant medium.

Definitions

"Circumferential" means lines or directions extending along the perimeter of the surface of the annular tread perpendicular to the axial direction.

"Cord" means one of the reinforcement strands of which the plies in the track are comprised.

"Equatorial plane (EP)" means the plane perpendicular to the track's axis of rotation and passing through the center of its tread.

"Footprint" means the contact patch or area of contact of the tread with a flat surface under load and pressure.

"Lateral" and "laterally" means lines or directions that are parallel to the axis of rotation of the tire (also "axial").

"Ply," means a continuous layer of rubber-coated parallel cords.

"Radial" and "radially" means directions extending radially toward or away from the axis of rotation of the track.

"Zero-degree wires" means at least one layer of parallel cords &usually metal wire), underlying the tread, unanchored to the bead, spiraling circumferentially around the tread, and having cord angles in the range from 0 degrees to 5 degrees with respect to the equatorial plane of the tire.

BRIEF DESCRIPTION OF THE DRAWINGS

The invention will be better understood by reference to the drawings when like numbers denote like parts throughout and wherein.

DETAILED DESCRIPTION OF THE INVENTION

Figure 1:
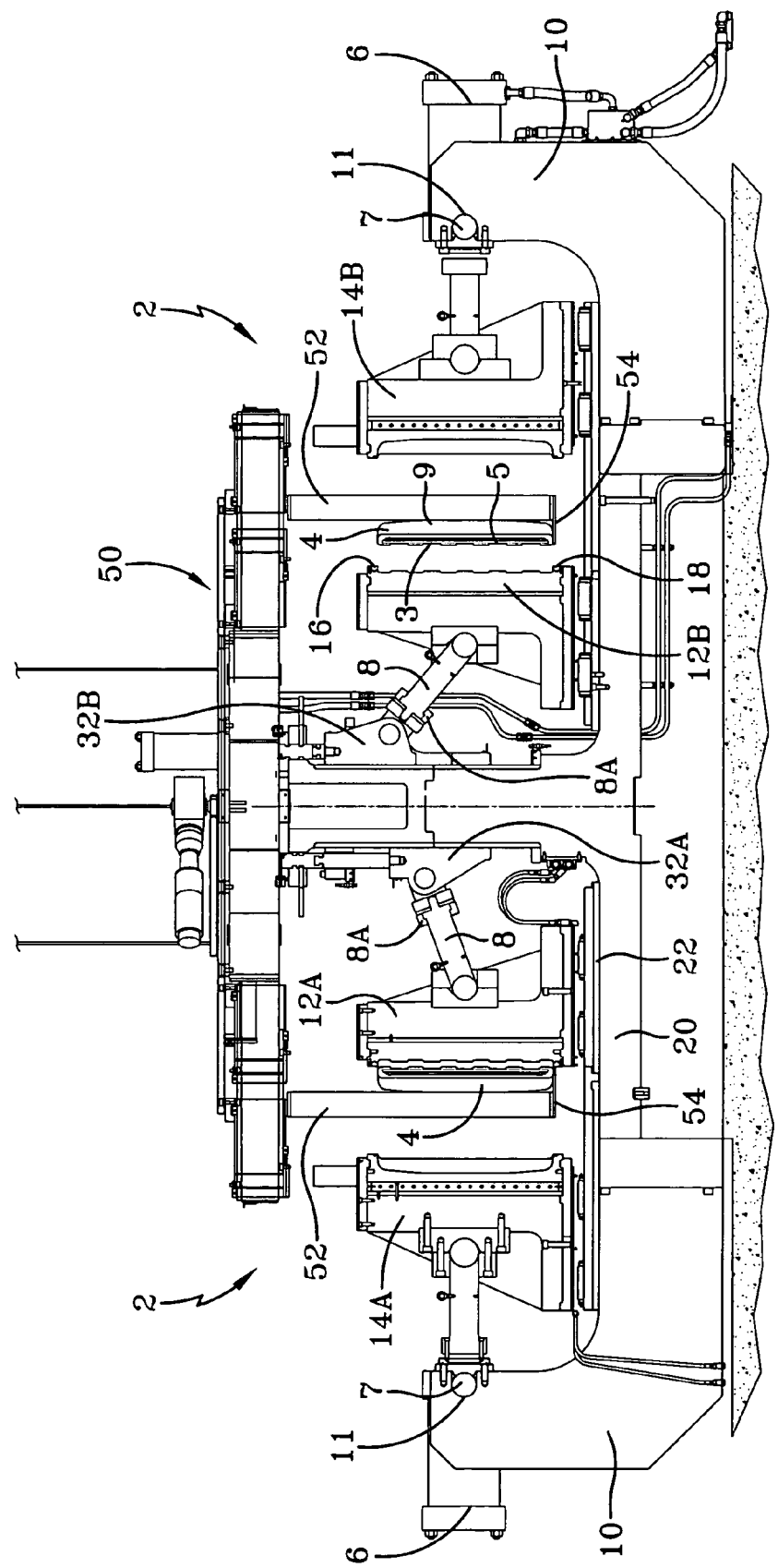
FIG. 1 illustrates a plan view of a mold according to the present invention and tread belt assembly shown in a cross-sectional view and shows the tread belt being supported on a transfer means while the mold is in a full open position.

With reference to FIG. 1, a plan view of a mold 2, according to the present invention, and a tread belt assembly 4 is shown in a cross-sectional view. The right half shows the tread belt 4 being supported on a transfer means 50 while the mold 2 is in a full open position. The left half of the mold 2 shows the tread belt 4 held by the transfer means 50 and the radially retracted open position that is less open than the right half. As illustrated, the transfer means 50 has a plurality of legs 52 with tread supporting feet 54 that support the entire weight of the tread belt 4 during a transfer of the tread belt 4 to the mold 2. These tread belts 4 can weigh in excess of 4,000 pounds, some many more times that. The transfer means 50 supports the weight such that the tread belt 4 can be positioned into an annular space between a plurality of inner mold segments 12 consisting of alternating segments 12A, 12B and a plurality of outer mold segments 14 consisting of alternating segments 14A, 14B. As better shown in FIG. 9, the inner mold segments 12 form the inner surface 3 of the tread belt assembly 4. Each inner segment 12 has radially extending outer portions 16,18 at both the top and the bottom, respectively, and the tread belt 4 can be positioned such that it is supported by these radially outward extending portions 16,18.

Figure 3:
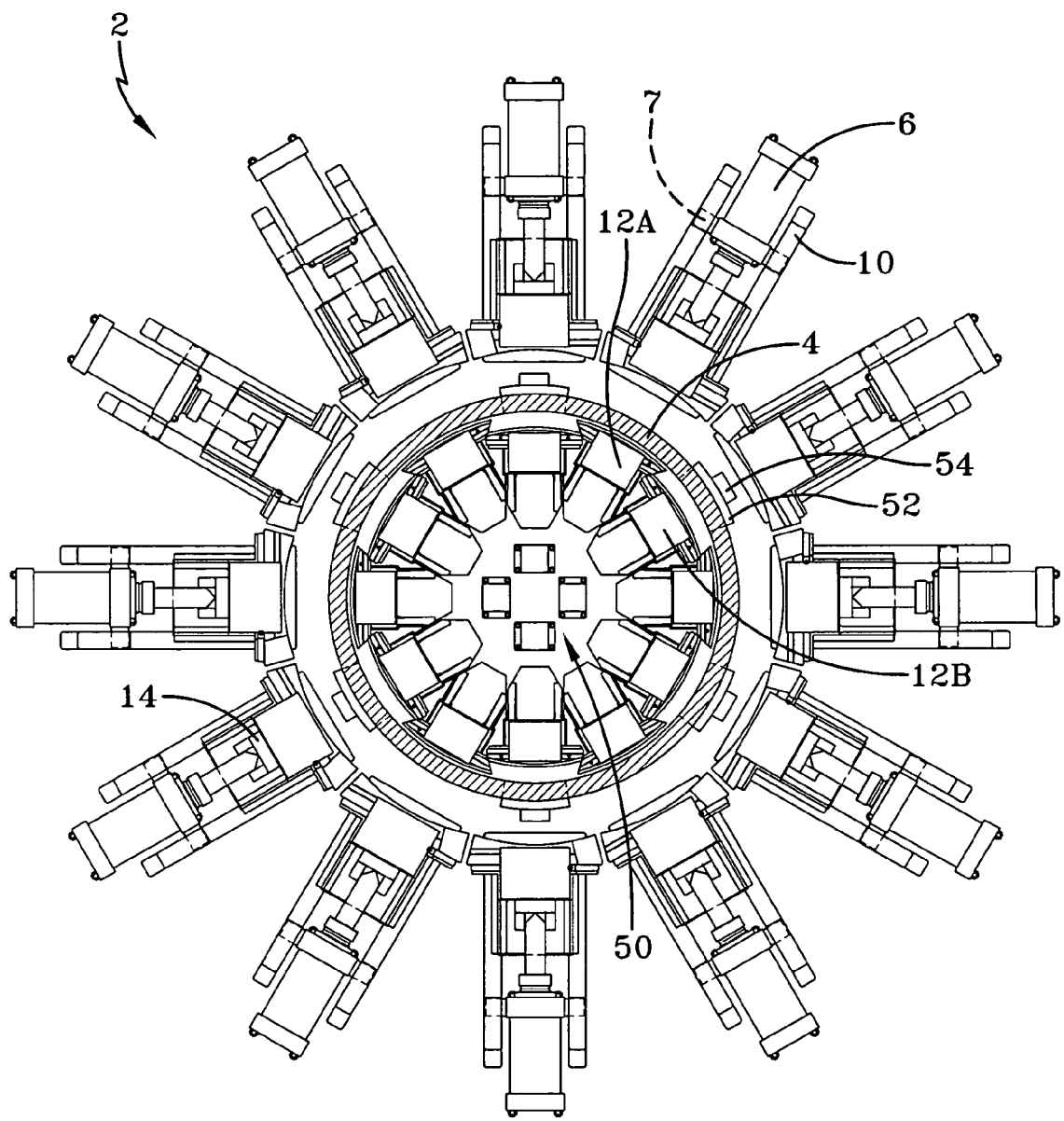
FIG. 3 is a top view of the mold according to the present invention showing the tread belt being supported by the transfer means and with the plurality of the radially inner segments in a retracted and open position.

As shown in FIG. 3 a top view of the mold 2 is shown and the plurality of legs 52 supporting the tread belt 4 are illustrated wherein alternating inner segments 12A of the mold 2 are retracted but in close proximity to the tread belt assembly 4. When these inner segments 12A are moved in contact with the tread belt assembly 4, the legs 52 are shown interposed between two of such contacting inner segments 12A. Accordingly, where the inner segments 12B are still shown in a retracted position not contacting the tread belt, the legs 52 are positioned fully supporting the tread belt assembly 4.

Figure 2:
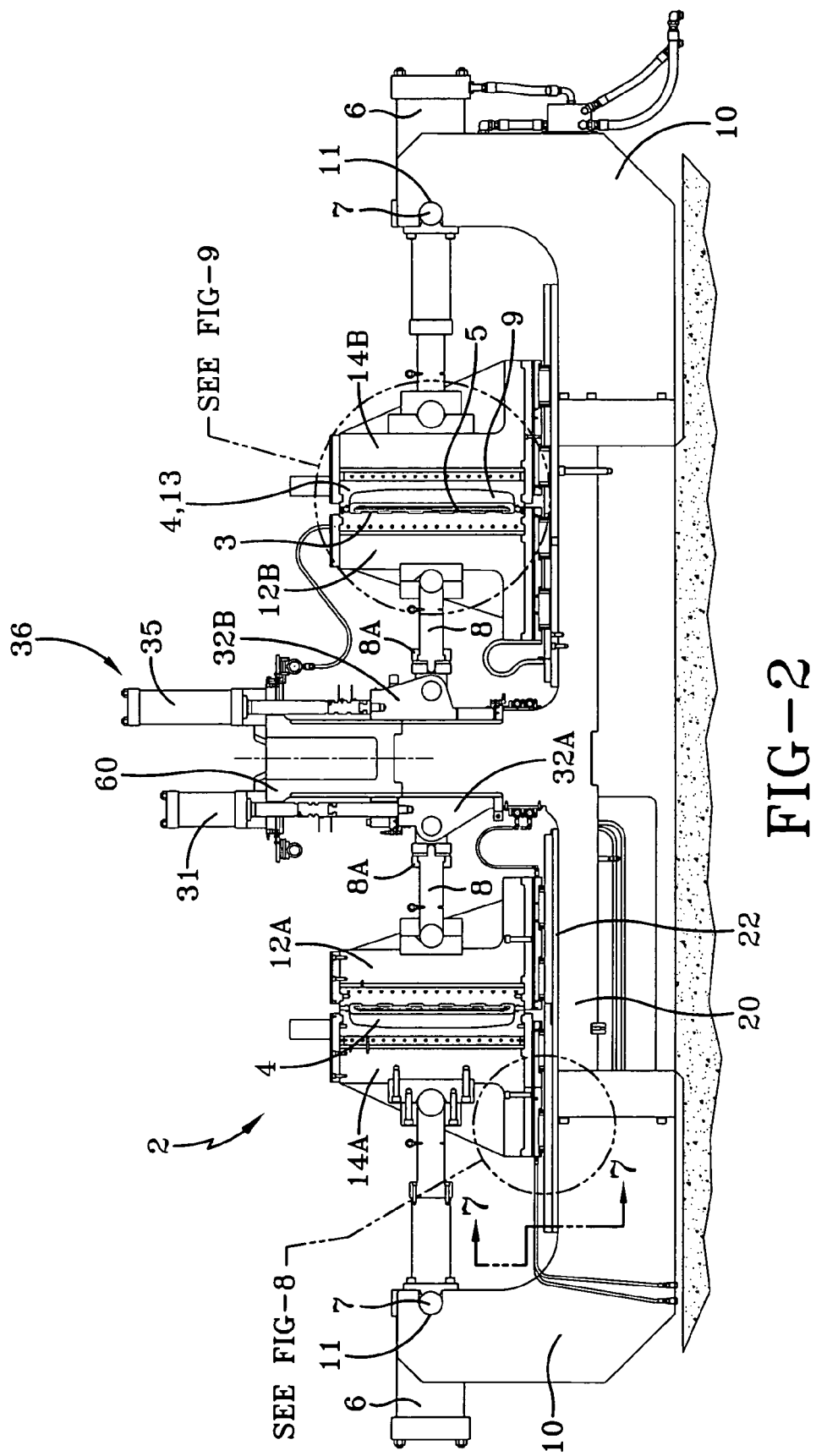
FIG. 2 is a cross-sectional view of the mold according to the present invention and the tread belt assembly being cured in a fully closed position.
Figure 4:
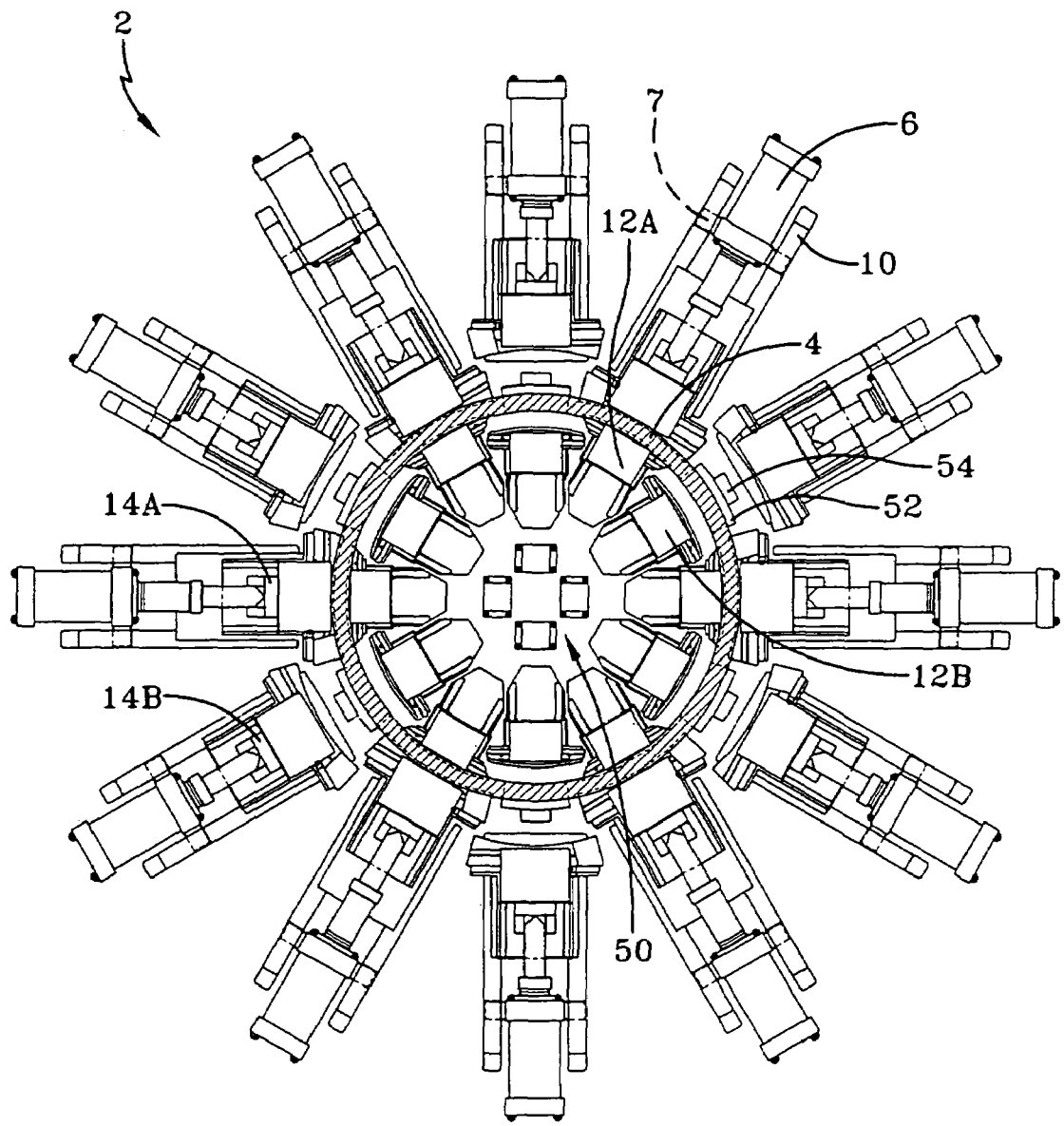
FIG. 4 is a second top view showing the tread belt while still being supported by the transfer means and a plurality of the inner segments and a partially closed plurality of outer segments.

With reference to FIG. 4, the plurality of radially outer segments 14A is moved into a contacting position with the tread belt assembly 4. These outer segments 14A are aligned with a contacting inner segment 12A. This provides a means for supporting the tread belt 4 at which point the transfer means 50 can be moved away from the tread belt 4 and the tread belt 4 can be supported by these alternating patterns of contacting inner and outer segments 12A, 14A. To remove the transfer means 50 (portions of which have been removed for clarity), the legs 52 are radially expanded outwardly and can be lifted vertically between the space between the tread belt 4 and the outer segments 14B. Once this is accomplished, the inner segments 12B that were in the retracted position can also be moved radially outward into a full contacting position with the tread belt 4. Once that is accomplished, the remaining outer segments 14B can be moved into a partial contact position aligned with the outer segments 14A at which point the outer segments 14A and 14B can be moved inwardly into a fully closed position and the tread belt 4 can be cured in the mold 2. This is as illustrated in FIG. 2.

An important aspect of the present invention is that after the outer segments 14A partially close against the tread belt assembly 4 in an alternating fashion the remaining outer segments 14B also come to a partially closed position once the legs 52 are removed. Once the outer segments 14A and 14BB are in this partially closed position while the inner segments 12A, 12B are in full contact position then it is possible to do a final close of the mold 2 at which point all the mold outer segments 14A and 14B come into a closed position as illustrated in FIG. 2. Once this is accomplished, the tread belt 4 is completely encapsulated within the mold 2. The movement of the mold mechanisms is controlled by several devices which will be discussed in greater detail later. What is of interest is that this tread belt 4 is extremely large and has a very sophisticated tread belt reinforcing structure. It is important that the tread belt assembly 4 be positioned within a mold and cured without distorting the tread belt's reinforcing structure 5. A further important aspect and concern of the present invention is that because the inner segments 12 and the outer segments 14 are rigid the volume that is available to form the tread belt assembly 4 between each segment 12,14 is generally fixed. However, due to the fact that rubber grows at approximately 2% while the component is being cured one of the sets of segments 12 or 14 has to be able to expand radially outwardly or inwardly to permit the tread belt 4 to grow as it is being cured. The alternative to growing the tread belt as the mold moves is to provide a tread belt 4 as slightly undersized within the mold cavity 13 and allow the tread belt 4 to expand to fill the cavity 13. This, unfortunately, has the drawback of creating opportunities for the rubber to flow in a rather uncontrolled manner causing defect features such as are commonly referred to as "lights". Far superior to providing undersized tread belts 4 it is more preferable to provide the tread belt at a proper size that will fit the cavity 13 between the inner and outer segments 12,14 and allow either the inner or outer segments 12,14 to be pushed by the tread belt assembly. Preferably not both of the segment sets 12,14 should be pushed or moved in the process. In the present invention it was determined that due to the critical nature of the tread belt reinforcing structure 5 it is preferable that movement of the outer segments 14 be allowed while the inner segments 12 be maintained at a relatively constant dimension. This is true because movement in the tread area 9 only affects the tread rubber compound but not the metal cords and wires of the belt structure 4 which need to be in a non-disturbed orientation during curing. This is best achieved by allowing the outer segment 14 to expand slightly due to thermal growth of the rubber.

To achieve the optimal size of the tread belt 4 it is important that the tread belt assembly 4 as it is being formed is provided to a size or volume that is controlled by either weight or specific gravity, preferably the specific gravity of the rubber as it is being applied to the tread belt 4 is known and the precise amount of rubber is then applied. Accordingly, the volume of the tread belt 4 at any location is generally known and matches the cavity 13 of the mold 2 sufficiently that movement of rubber is minimized.

As noted, the outer segments 14 are all partially in contact with the tread rubber just prior to closing and then are driven into a full contact closed position in the mold 2 curing cycle such that the movement of the tread forming ribs on the outer segments 14 is occurred rather uniformly such that the rubber as it is being pushed is pushed uniformly around the 360° circumference of the tread belt 4.

Figure 10:
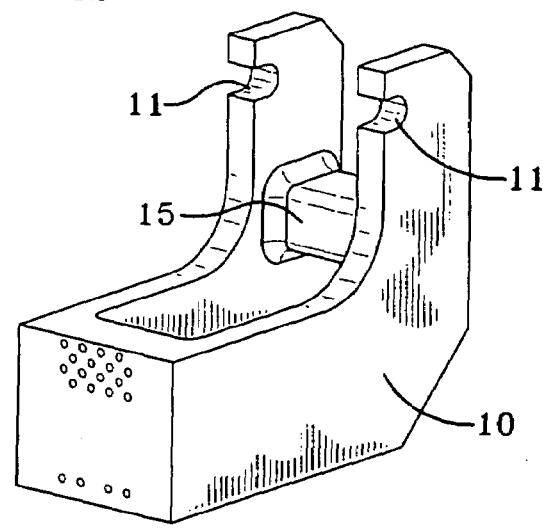
FIG. 10 is a perspective view of a split J frame of the mold frame.

As shown in FIGS. 1 and 2, the movement of the outer segments is controlled by a large cylinder connected by pins 17 to the outer segments 14 and attached to what is called a split J frame. The split J frame 10 as shown in FIG. 10 provides support for the outer segment 14 and also for an attachment to a frame structure 20 that supports the inner segments 12. The split J frame 10 is a casting that provides a flat base and curves upwardly to a pair of slots 11. These slots 11 provide an axle support 7 for the cylinder 6 as shown in FIG. 1. Between the split J a reinforcement brace 15 is positioned to provide added structural integrity. In the illustrated embodiment as shown in FIG. 4 there are approximately twelve inner and outer segments 12,14. Each outer segment 14 rests on a split J frame 10 supporting the outer segment. Each split J frame is 10 is securely attached to the floor and is exposed to approximately 1.8 million pounds force during curing. As shown, the J frames are also cantilevered off the frame 20 and under load can deflect about 0.12 inches (3 mm) or less which is easily accommodated by the pivoting axle support 7 and pin 17 connecting the cylinders 6 to the J frame and the outer segments 14. The entire mold sees approximately 22 million pounds force around the entire periphery. The outward cylinders 6 are quite massive and are approximately 16 inches in diameter and have a stroke of approximately 20 inches.

Figure 5:
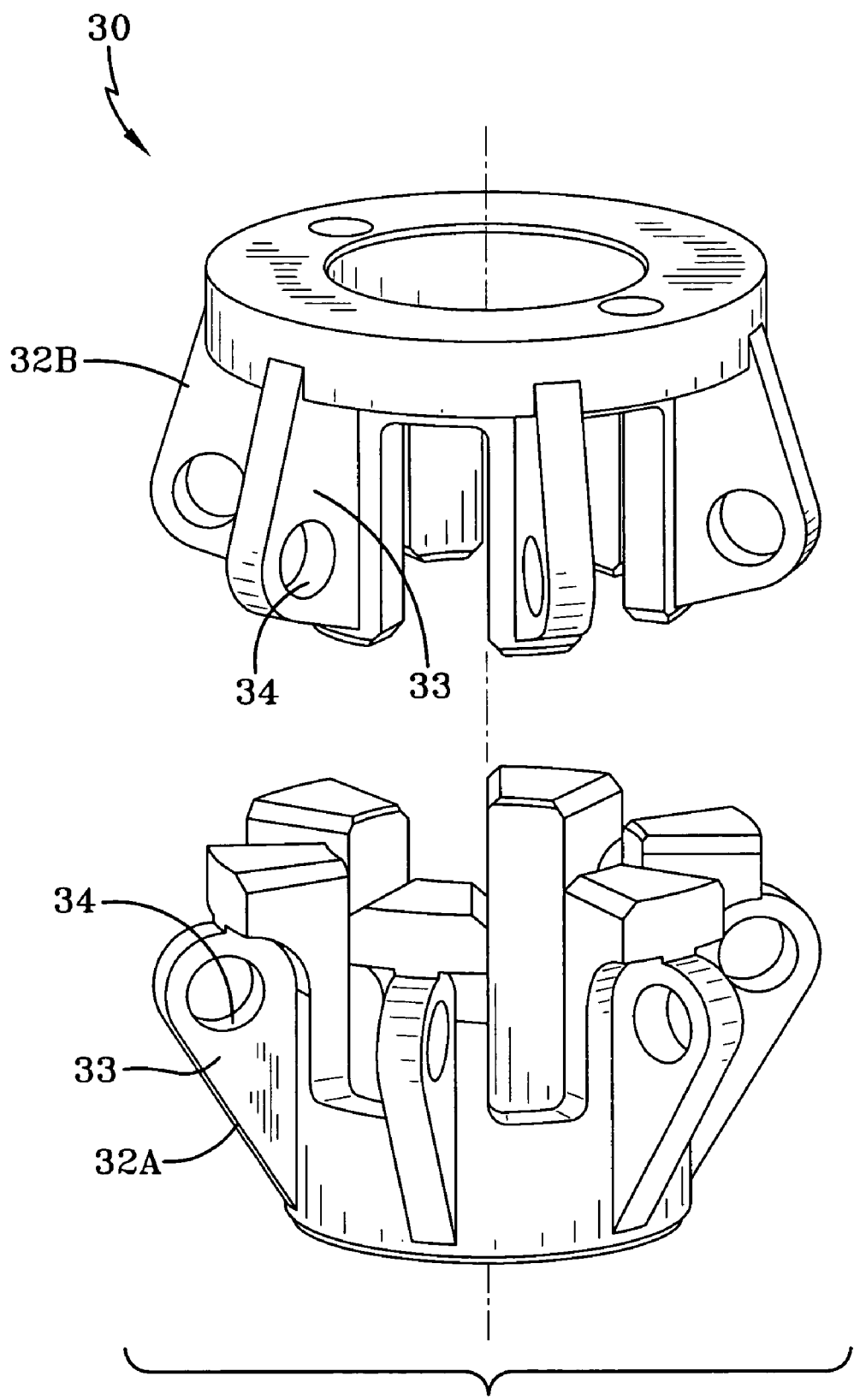
FIG. 5 is a perspective view of the inner actuating sliding hub assembly showing the upper hub portion and lower hub portion in a separated fully open position.
Figure 6:
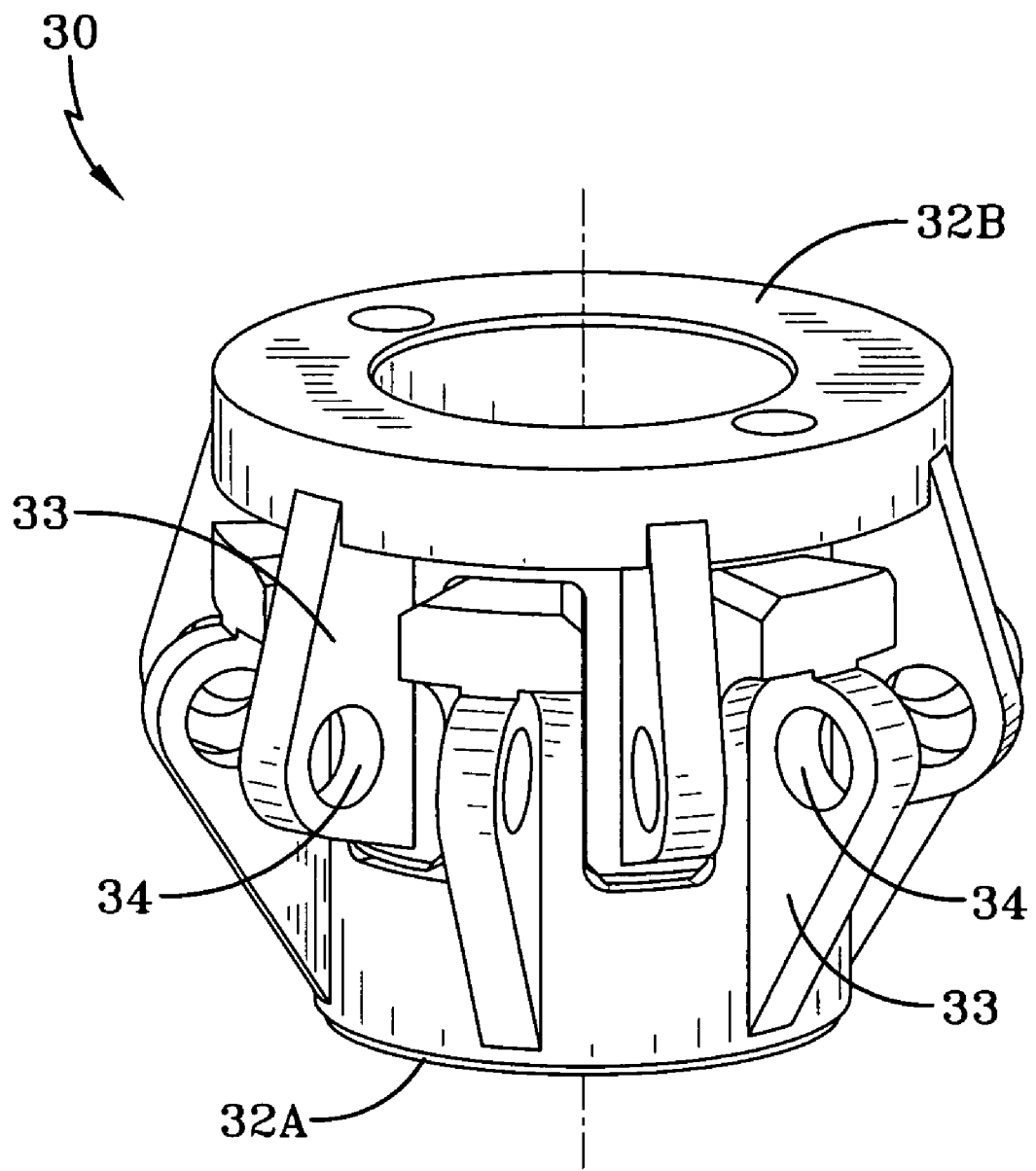
FIG. 6 is a perspective view of the inner actuating sliding hub assembly showing the upper and lower hub portion interlocked in the fully closed position wherein the inner segments would be radially moved outwardly by the action of the hub portions to form an annular ring.

Due to the fact that the during curing outer segments 14 are allowed to move to accommodate the thermal expansion of the rubber and the tremendous forces that are exerted, it was desirable that the inner segments 12 be provided so that a tremendous mechanical advantage can be achieved to prevent the inner segments 12 from moving radially inwardly. This has the advantage of ensuring that the diameter of the molded tread belt 4 will be precise in every manufacture and that the tolerance changes will only result in very minor or subtle variations. With reference to FIGS. 1 and 2 the inner segments 12 are supported on a frame 20 and the driving mechanism includes an actuating slidable hub assembly 30 that provides radial movement for the inner segments 12 and is co-axially mounted slidably onto a central post or shaft 60. This slidable hub assembly mounted onto the central post or shaft 60 is best illustrated in FIGS. 5 and 6. The slidable hub assembly 30 has an upper portion 32B and a lower portion 32A as illustrated. Each upper portion 32B and each lower portion 32A has casting locations 33 with a hole 34 for attaching a mechanical link 8.

These mechanical links 8 are shown in FIGS. 1 and 2 and one link 8 is connected by pins 17 to each radially inner segment 12A, 12B. The upper hub portion 32B has attached to it through the pivotable links 8 all the inner segments 12B in alternating sequence and interspaced between each inner segment 12B and an upper hub portion 32B of the hub assembly 30 are the links 8. This enables the upper hub portion 32B and lower hub portion 32A of the hub assembly 30 to move independently and to drive the inner segments 12A, 12B in an alternating pattern around the circumference independent of either the connected upper portion segments or the connected lower portion segments. This means 36 for providing radial movement of the inner segments 12A, 12B includes not only the hub assembly 30 but also cylinders 31,35 as clearly illustrated in FIG. 2. One cylinder 31 moves the lower hub 32A into a lower position such that the linkage mechanism or links 8 are shown almost horizontal. The upper portion of the hub 32B is driven by the second cylinder 35 which also moves the hub 32B downward until the linkage mechanism or links 8 connected to that segment 12B are also shown in an almost horizontal position. Once this is achieved the upper and lower portions 32A, 32B of the hub assembly 30 are intertwined as shown in FIG. 6. This creates an interlocking of the central hub assembly 30 providing superior strength and also providing a way of achieving an almost horizontal mechanical locking of the inner segments 12A, 12B. Once this is achieved, a tremendous mechanical advantage has occurred such that the forces trying to push the inner segment 12A, 12B inwardly are resisted by a complete mechanically stiffened structure. The linkages 8 between each segment 12A, 12B as illustrated are approximately six inches in diameter to handle the massive loads and to prevent buckling of the components.

As shown in FIG. 2 the hub assembly 30 when moved to the mold close position has the holes 34 virtually aligned in both the upper hub portion 32B and the lower hub portion 32A with the centerline of the tread belt 4 as defined as the distance halfway between the lateral edge of the tread belt between the mold portions 16, 18. As further noted the linkages 8 are pinned at locations 34 of the hub assembly 30 and at the inner segments 12A and 12B at the vertical centerline of the formed tread belt. This ensures that the linkages all line in the same horizontal plane minimizing any off-center loading due to the curing pressure.

Assuming one designs a hub assembly 30 using vertical pairs of linkages 8 in place of a single linkage 8, then it would be desirable that the midpoint of the pairs be on the vertical centerline and that the upper and lower attachment locations of one hub portion could be aligned with the corresponding attachment locations of the other hub portions although this would not be critical as long as the midpoints of the pairs of linkages align with the vertical centerline of the tread.

Figure 7:
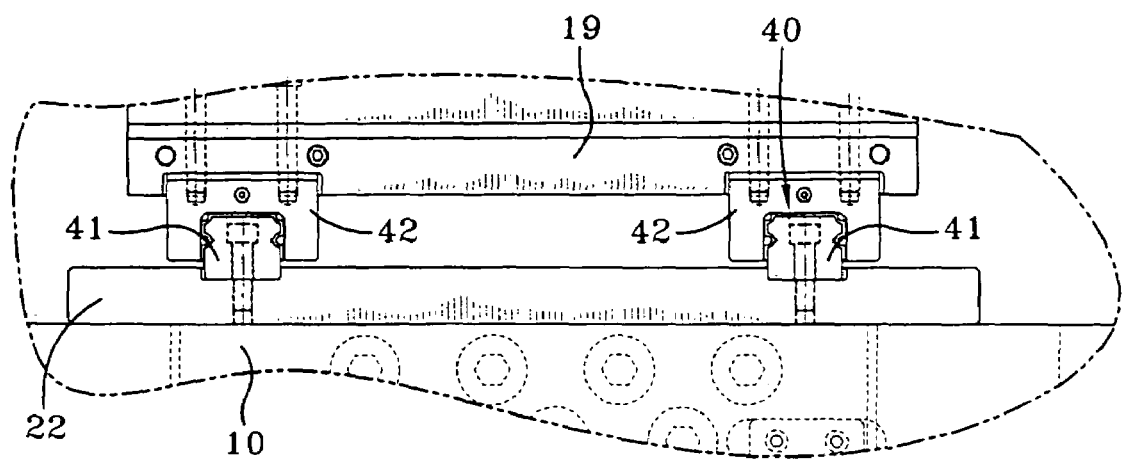
FIG. 7 is a partial end view of the mold taken from FIG. 2 showing the linear bearing mechanism.

The inner and outer segments 12, 14 are mounted onto a support plate 22 and the support plate 22 has a pair of linear bearings 40 as illustrated in FIG. 7 that extend inwardly towards the central shaft 60. These linear bearings 40 provide movement about the inner and outer segments 12,14. The pair of linear bearing rails 41 as shown in FIG. 7 have linear bearing blocks 42 attached to the inner and outer segments 12, 14, respectively. Each inner segment 12 and each outer segment 14 has four bearing blocks 42 as illustrated, two bearing blocks 42 being slidably attached to each linear bearing rail 41.

Figure 8:
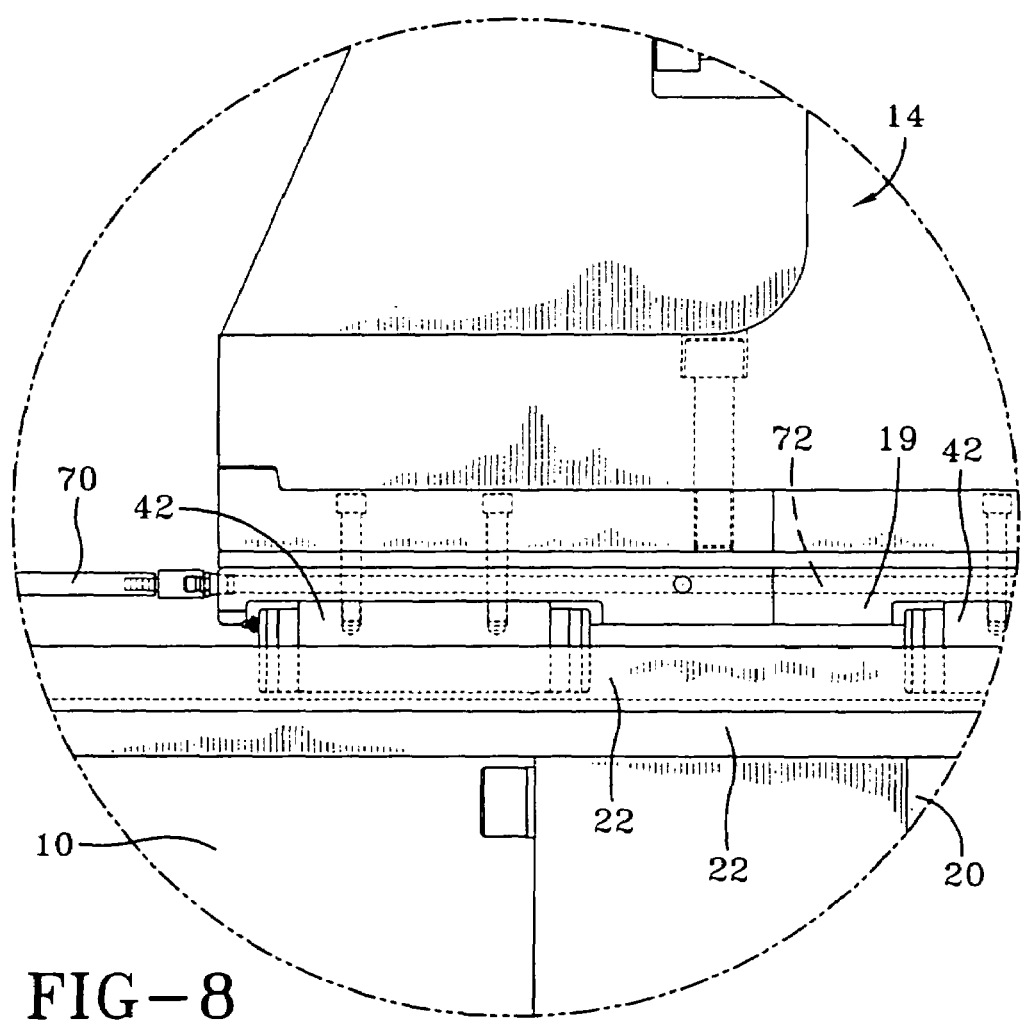
FIG. 8 is an enlarged view of the lower portion of a mold segment taken form FIG. 2.

With reference to FIG. 8, a cooling line 70 is shown. The cooling line 70 passes of fluid medium 72 into channeled cooling plate 19, to which inner and outer segments 12, 14 are attached. This cooling medium 72 keeps the cooling plate 19 at approximately ambient or room temperature such that the linear bearing blocks attached to the cooling plate 19 remain at a low temperature while the inner and outer segments 12, 14 are heated to provide the curing temperature. It was found that on such a large mold 2 having a diameter of approximately ten feet or greater, that the movement of the linear bearings 40 and the thermal contraction and expansion of the frame 20 had to be controlled such that the frame 20 is generally always at room temperature and not growing substantially with a thermal gradient which would provide an uncontrolled internal diameter based on the growth of the mold 2 and its associated frame 20 over a period of time as the temperature gradient increased. By maintaining the frame 20 at approximately room temperature the dimensional control of the finished product is greatly improved. In addition, the cooling of the plate 19 between the inner segments 12 and the bearing blocks 42 and the outer segments 14 and the bearing blocks 42 greatly enhances the life of the linear bearings 40.

Figure 9:
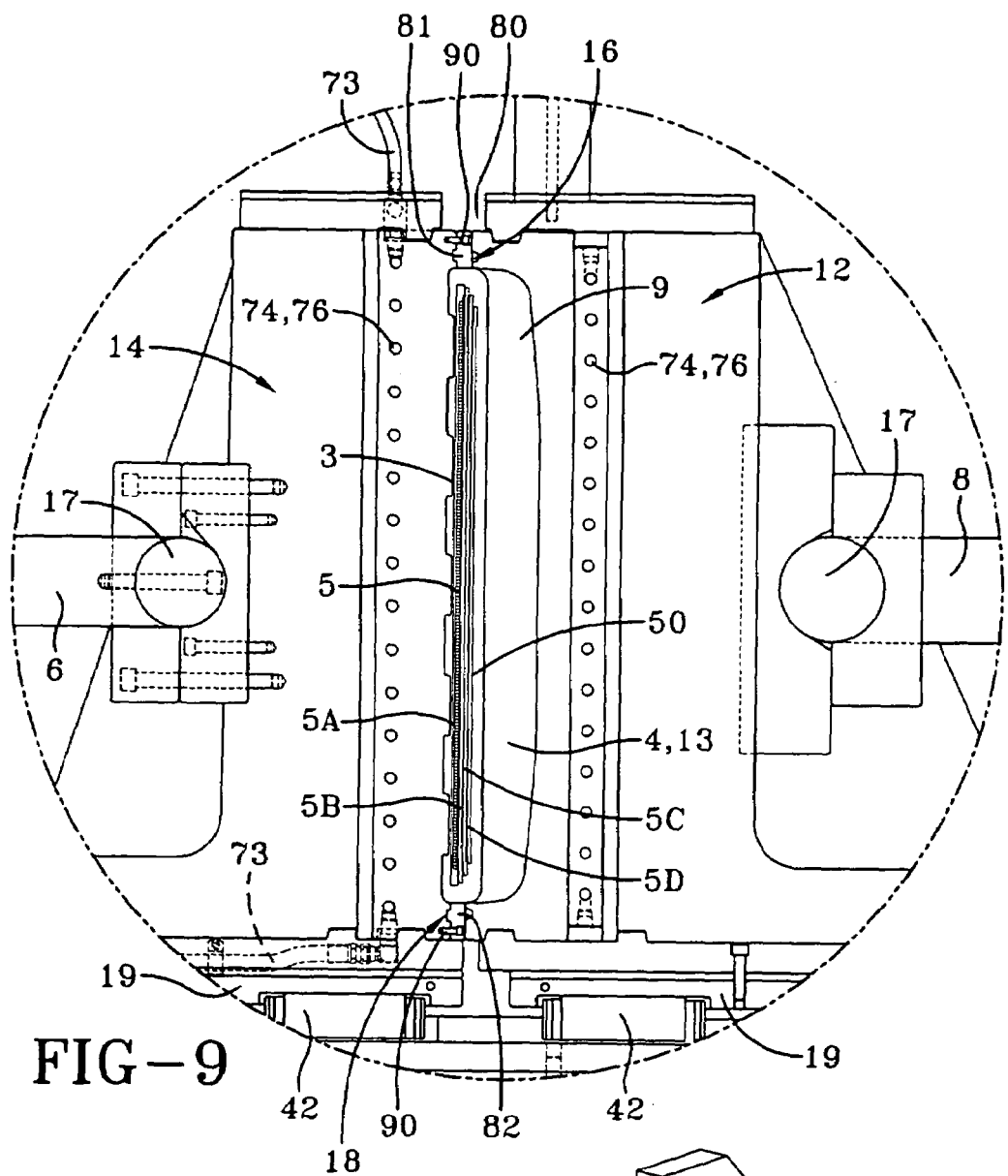
FIG. 9 is an enlarged view of the mold segments taken from FIG. 2.

With reference to FIG. 9 an enlarged view of the tread belt 4 in the closed position is illustrated. As shown, the inner segment 12 has fluid medium passages 74 to provide heated fluid 76, either water or steam or any other suitable heating medium, to provide a curing temperature. Similarly, the outside segments 14 also have a fluid medium 76 and passages 74 providing heat to the outer segment 14. An important feature illustrated is that the parting line 80 for the two mold segments 12,14, that is, the place where the two mold segments 12,14 meet, is approximately at the radially outer location of the belt layers 5A, 5B, 5C, 5D, preferably between the two radially outermost belt layers 5C, 5D. As illustrated, the parting line 80 is shown in a closed position. The closure of the parting lines 80 very precisely was achieved in the present invention by providing shims 8A as shown in FIG. 1 in the mechanical links 8. The shims 8A were machined precisely to the closed position at temperature for mold curing. This ensures that the parting line 80 starts in a fully closed abutting position or approximately fully closed depending on the size of the tread belt assembly. As the tread belt 4 is being cured and the rubber expands, the parting line 80 is allowed to gap or open. It was determined that providing a parting line 80 towards the radially outer portion of the tread belt 4 enables the tread belt 4 to be performed very uniformly. Furthermore, by providing the parting line 80 very close to the tread area 9 permits the tread area to flow in and fill the parting line 80 gap as the tread rubber and belt rubber expand. This is quite beneficial and it ensures that very little movement of the rubber near the tread belt 5 area can occur. The tread belt 5 has belt layers such that the radially inner belt layer 5A is approximately very close to the lateral edge of the tread belt assembly 4. This being so, if the inner segments 12 have the parting line 80 as shown near the radially inner belt it is possible for the rubber to flow at that area. When that occurs, the tread belt structure 5 distorts the lateral ends creating a weakened position. If the parting line 80 is moved outwardly as illustrated, the tread belt assembly has very little rubber flow movement in the area near the belt structure 5. As illustrated, the parting line 80 is actually achieved by an upper and lower plate 81, 82 that has been bolted with fasteners 90 to the inner segment 12. This effectively moves the parting line 80 outwardly towards the outer segment 14 and closer to the tread rubber 9.

As further illustrated, the tread belt assembly 4 has a radially outer tread area 9 and a radially inner surface 3 having a plurality of ribs 3A and grooves 38. The radially inner surface 3 provides an interface between a carcass or casing assembly to which the tread belt 4 is to be later mounted for use. Above the inner surface 3 is the entire tread belt reinforcing structure 5. As illustrated, the tread belt reinforcing structure includes a first belt layer 5A including zero degree wires circumferentially wound about the tread belt assembly 4 and interposed between the circumferential wire layers 5A and a radially outermost belt layer 90 are two cross plies 5B, 5C, each cross ply 5B, 5C having lateral edges being moved axially inwardly from the circumferential belt wire 5A lateral edges such that each radially outer belt layer 5B, 5C, 5D, respectively, is slightly narrower than the radially inner adjacent layer. Outward of the two cross ply layers 5B, 5C as illustrated is a 90° wire layer 50 which provides tremendous axial strength. The parting line 80 is positioned very close to this 90° wire layer 50. As can be appreciated as the parting line 80 is in alignment with a 90° layer 50 growth in the lateral extent is resisted by the 90° wires. This provides substantial strength and helps prevent buckling or other non-uniformities to occur in the lower layers 5A, 5B and 5C. A further benefit is that as the parting line 80 is closer to the narrowest belt 50, far less movement of the rubber compound around the belt structure 5 can occur and the primary movement will be from the tread rubber 9 which is of no consequence. While these features may seem subtle, they are extremely important in manufacturing a quality tread belt structure 4. For example, a typical large off-road pneumatic radial tire has the largest or widest belt layer 3.65 inches from the tread's lateral edge. A similarly sized two-piece tread belt has the widest belt layer 1.25 inches or approximately 300% closer to the lateral edge of the mold. Accordingly, the sensitivity to belt distortion at the lateral edges of the tread belt 4 is significantly increased. Avoidance of undesirable flows of rubber are mandated because the resultant distortion of the belt layers 5A through 5D can adversely affect the durability of the tread belt 4.

What is claimed is:

1. A segmented annular mold for forming a tread belt having a reinforcing belt structure having a radial thickness (t), the mold comprising: a plurality of radially movable inner segments for forming the inner surface of the tread belt; holding means for maintaining the inner segments at relatively constant dimension during molding, wherein the holding means further includes a slidable hub assembly, wherein the slidable hub assembly further includes a central shaft, an upper hub portion and a lower hub portion each slidably mounted onto the central shaft; and each upper and lower hub portions having a plurality of linkage arms pivotably connected to the respective hub portion and the radially inner segments, and
   a plurality of radially movable outer mold segments for forming the outer tread belt surface wherein the radially inner and radially outer segments form a mold parting line.

2. A segmented annular mold for forming a tread belt comprising:
   a plurality of outer tread belt forming segments;
   a plurality of radially movable and outwardly expandable inner segments for forming the inner surface of the tread belt;
   a slidable hub assembly, the slidable hub assembly having a central shaft, an upper hub portion and a lower hub portion each slidably mounted onto the central shaft; each upper and lower hub portions having a plurality of linkage arms pivotably connected to the respective hub portion and the radially inner segments, each circumferentially adjacent inner segment being connected to either the upper or lower hub portion in an alternating pattern, the movement of one of the hub portions relative to the other hub portion being independently actuated by one or more means for moving the hub portions, and wherein the movement of the lower and upper hub portions into interlocking alignment moves the inner segments to form an annular ring.

3. The segmented annular mold for forming a tread belt of claim 2 further comprising:
   a plurality of split J frames, one split J frame for supporting each outer tread belt forming segment.

4. The segmented mold for forming a tread belt of claim 3, further comprises:
   a base plate support attached to each split J frame;
   a plurality of linear bearing rails and bearing blocks, the bearing blocks being attached to the inner and outer segments, a pair of the linear bearing rails providing linear guides for the segments.

5. The segmented mold for forming an annular tread belt of claim 4 further comprises:
   a cooling plate interposed between each segment and the linear bearing blocks attached to the respective segment.

6. The segmented mold for forming a tread belt of claim 5 wherein the cooling plate has a plurality of passages for passing a coolant medium.

7. A segmented annular mold for forming a tread belt comprising:
   a plurality of outer tread belt forming segments;
   a plurality of radially movable and outwardly expandable inner segments for forming the inner surface of the tread belt;
   a slidable hub assembly, the slidable hub assembly having a central shaft, an upper hub portion and a lower hub portion each slidably mounted onto the central shaft; wherein the hub portions are connected to the inner segments.

8. The segmented mold of claim 7 wherein each upper and lower hub portions having a plurality of linkage arms pivotably connected to the respective hub portion and the radially inner segments.

9. The segmented mold of claim 8 wherein each circumferentially adjacent inner segment is connected to either the upper or lower hub portion in an alternating pattern.

10. The segmented mold of claim 9 wherein the movement of one of the hub portions relative to the other hub portion being independently actuated by one or more means for moving the hub portions, and wherein the movement of the lower and upper hub portions into interlocking alignment moves the inner segments to form an annular ring.

* * * * *